May 12, 1925.
T. C. JOHNSON
TWINE HOLDER
Filed May 28, 1924
1,537,356
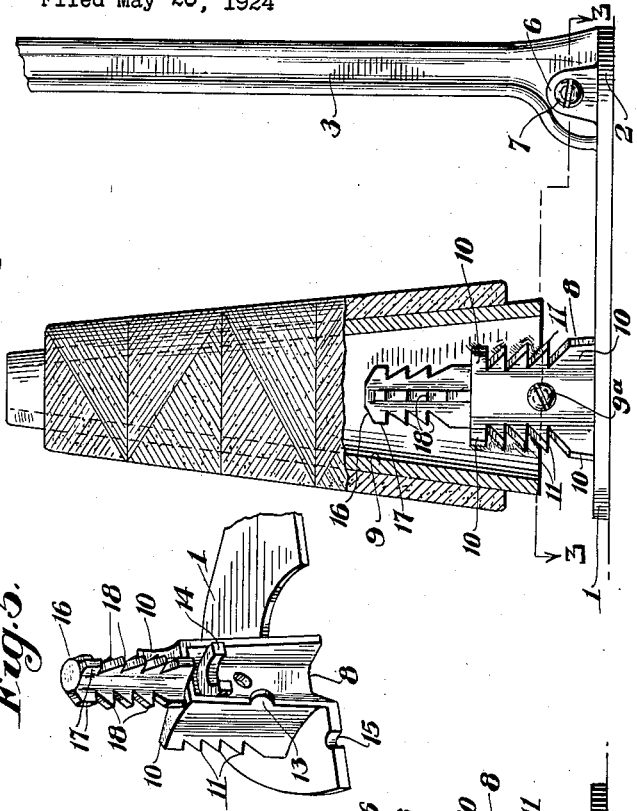
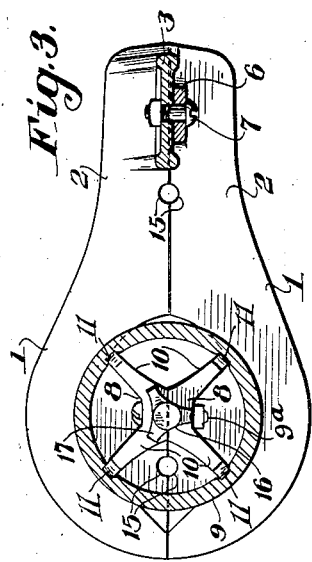
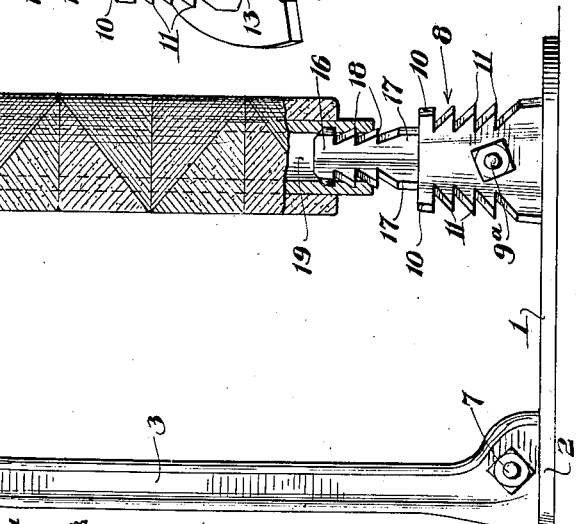
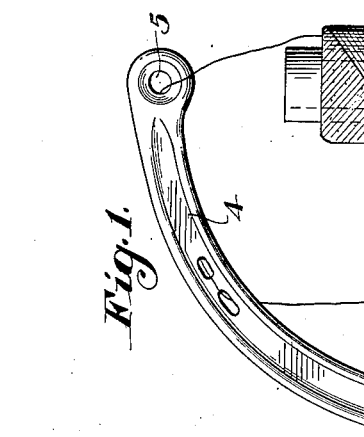
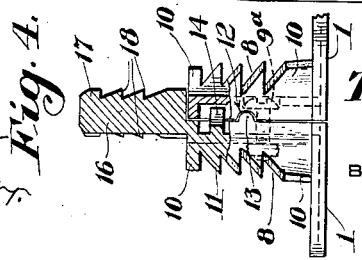
INVENTOR
*Thomas C. Johnson*
BY
ATTORNEY
WITNESSES Patented May 12, 1925.

1,537,356

UNITED STATES PATENT OFFICE.

THOMAS C. JOHNSON, OF QUINCY, ILLINOIS.

TWINE HOLDER.

Application filed May 28, 1924. Serial No. 716,425.

*To all whom it may concern:*

Be it known that I, THOMAS C. JOHNSON, a citizen of the United States, residing at Quincy, in the county of Adams and State of Illinois, have invented a new and useful Twine Holder, of which the following is a specification.

This invention relates to twine holders.

The object is to provide a simple, cheaply manufactured, strong and durable device for holding twine in position and for freely dispensing the same for wrapping bundles, etc., the device being adapted to be secured in position upon a table or counter, or upon the wall or ceiling as desired.

Another object is to provide a holder which is adapted to receive and support twine which has been wrapped upon a conical core or support, usually formed of heavy paste-board, and which by a slight pressure may be forced into frictional engagement with the holder to be supported thereby until the twine is consumed, the said holder being equally well adapted for the reception in like manner of twine wrapped on cylindrical, paste board tubes, spools or reels.

A final object is to construct a twine holder of this character having a wide, flat base member composed of two sections suitably held together so as to facilitate the casting of the metal of which the same is composed.

A full and complete understanding of the invention may be obtained from a consideration of the following detailed description, taken in connection with the accompanying drawing forming a part of this specification, it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:

Figure 1 is a side elevation of the twine holder supporting twine wrapped about a spool or reel;

Figure 2 is a similar view, certain parts being omitted, and showing the manner of supporting twine wrapped upon a conical member;

Figure 3 is a horizontal sectional view taken on the line 3—3 of Figure 2;

Figure 4 is a detail view illustrating the manner of constructing the twine supporting post;

Figure 5 is a detail perspective view of one section or member of the twine supporting post.

In the drawing there is illustrated a twine holding device which is adapted for use in stores, etc. where a relatively large quantity of twine is required for ready use for the purpose of wrapping bundles, etc., the end of the twine being always held in readiness to be grasped and unwound from the holder as desired.

The device comprises a metallic base 1, preferably of elongated form having one end enlarged and substantially circular in plan, and the other end extended as clearly shown at 2, in Figure 3. The base is longitudinally divided to form two equal halves or sections, which facilitates casting the same, and one of said sections is provided at the outer end of the extension 2 with an upstanding twine-guiding arm 3, preferably ribbed at its front and rear edges throughout its length, and having a forward bend 4 at its upper end terminating in an eye 5 located directly over the center of the aforesaid circular enlargement of the base.

The extension 2 of the other half or section is provided with an upstanding lug 6 in line with the arm 3, the two sections being suitably apertured for the reception of a bolt 7, which securely binds them together at this end.

At the center of the circular enlargement of the base, each of the sections is provided with an upstanding post section 8 which, when in abutting relation and held together, form an upstanding post for the purpose of supporting a cone-shaped winding drum 9 upon which twine is frequently wrapped for the above-named purpose, as shown in Figure 2. Each post section 8 is suitably apertured, transversely of the joint for the reception of a bolt 9ª, which in conjunction with the first-named bolt 7 serves to hold the two sections together and to constitute a single supporting post.

The sections 8 are provided with a plurality, preferably two each, of outstanding, radial wings 10, the outer edges of which are tapered from the bottom to the top to conform to the taper of the aforesaid cone 9, and the said outer edges are provided with a plurality of teeth 11 which point downwardly towards the base and are adapted to impinge the inner face of said cone and, when the same is thrust downwardly thereon, to securely hold the cone with the twine wrapped about the same in rigid position.

The post members or sections 8 are each formed hollow, and at their outer meeting edges one of the same is provided with a recess 12 while the other is provided with a correspondingly shaped lug 13 interfitting therewith to aline the parts and assist the bolts in holding the sections together. One section 8 is also provided within the same with a spacing flange 14 having spaced abutting ends for bearing against the interior of the other section 8, and the base members are provided with alined semi-circular openings 15 which, when alined, form suitable apertures for screws to hold the device to a counter or wall or other support.

One of the post sections 8 is provided with a superimposed post 16, which is offset therefrom so as to lie exactly in the center of the main post below when the two base members are secured together, and the said superimposed post 16 is also provided with a plurality of wings 17 having straight, vertical outer edges provided with downwardly pointed teeth 18 which are adapted to impinge into the inner walls of a tubular paste-board spool or reel 19, upon which twine is sometimes wrapped, as shown in Figure 1. The radial wings of the superimposed post are of less radial extent than those of the lower post so as to provide shoulders at the junction of the latter.

When either the cone 9 or the spool or reel 19 is thrust into position upon the device, the respective teeth hold the same rigidly in position and the end of the twine is passed through the aforesaid eye 5 and dispensed as needed and the same may be readily detached therefrom when the supply is exhausted, by simply using sufficient force.

From the foregoing it will be seen that a simple and inexpensive device has been provided for holding and dispensing twine, whether wrapped upon a cone or upon a spool or reel, which may be readily placed in position thereon without any necessity for adjustment or manipulation of parts, and which may not be accidentally detached therefrom.

What is claimed is:—

1. A twine holder comprising a base having an upstanding twine-guiding arm at one end, an upstanding integral post formed at the other end thereof, said post having radial wings with teeth formed in their outer edges to impinge within the larger end of a twine-carrying cone and support the same, and a superimposed, integral post mounted thereon and having radial wings of less radial extent than those of the lower post to provide shoulders at the junction with the latter, and teeth formed in the outer edges of the same to impinge within one end of a twine-carrying spool or reel and support the same.

2. A twine holder having a base, a twine-guiding arm formed integrally at one end thereof, and a post formed at the other end thereof, said post comprising a plurality of radial wings tapering towards their upper ends and provided in their outer edges with downwardly pointed teeth for engaging within the larger end of a twine carrying cone, and a superimposed post carried by the first-named post and comprising a plurality of radial wings of less radial extent than the lower wings and having vertical outer edges parallel to each other and provided with downwardly pointed teeth to engage within one end of a twine-carrying spool or reel.

3. A twine holder having a flat base composed of two sections, a twine guiding arm formed at one end of one of the base sections, a lug formed on the other section, a bolt traversing the arm and lug to hold the sections together at one end, a post comprising upstanding, tapered wings carried by the other end of the base, the outer edges of the wings being tapered upwardly and provided with downwardly pointed teeth, said post being formed in vertical halves each formed integrally with one of the base sections, and a bolt traversing said halves of the post to hold the base sections together at the other end.

4. A twine holder having a flat base composed of two sections, a twine guiding arm formed at one end of one of the base sections, a lug formed on the other section, a bolt traversing the arm and lug to hold the sections together at one end, a post comprising upstanding, tapered wings carried by the other end of the base, the outer edges of the wings being tapered upwardly and provided with downwardly pointed teeth, said post being formed in vertical halves each formed integrally with one of the base sections, one of said halves carrying an upstanding, superimposed post arranged in axial alinement with the lower post and comprising a plurality of radial wings of less radial extent than the same and having vertical outer edges provided with downwardly pointed teeth, and a bolt traversing said halves of the lower post to hold the base together at the other end.

In testimony that I claim the foregoing as my own, I have hereto affixed my signature.

THOMAS C. JOHNSON.